(12) United States Patent
Bond

(10) Patent No.: US 8,739,480 B1
(45) Date of Patent: Jun. 3, 2014

(54) EMERGENCY STORM SHELTER ASSEMBLY

(71) Applicant: Reid A. Bond, Amarillo, TX (US)

(72) Inventor: Reid A. Bond, Amarillo, TX (US)

( * ) Notice: Subject to any disclaimer, the term of this patent is extended or adjusted under 35 U.S.C. 154(b) by 0 days.

(21) Appl. No.: 13/912,688

(22) Filed: Jun. 7, 2013

(51) Int. Cl.
*E04H 9/14* (2006.01)

(52) U.S. Cl.
USPC ............... 52/202; 52/19; 52/167.1; 135/143

(58) Field of Classification Search
CPC ........................................................ E04H 9/14
USPC ............ 135/126, 139, 143; 52/19, 20, 167.1, 52/169.1, 169.6, 202
See application file for complete search history.

(56) References Cited

U.S. PATENT DOCUMENTS

| | | | | |
|---|---|---|---|---|
| 3,741,224 A * | 6/1973 | Clelland | ........................ | 135/87 |
| 5,505,265 A * | 4/1996 | O'Neil | ............................ | 169/48 |
| 6,240,939 B1 * | 6/2001 | McGee | ......................... | 135/143 |
| 6,325,085 B1 * | 12/2001 | Gower | ............................ | 135/90 |
| 7,481,014 B2 * | 1/2009 | Milburn | ......................... | 40/724 |
| 7,703,228 B2 * | 4/2010 | Zheng | ............................ | 40/610 |
| 7,931,037 B1 * | 4/2011 | Ryan | ............................. | 135/117 |

* cited by examiner

*Primary Examiner* — Andrew J Triggs

(57) ABSTRACT

An emergency storm shelter assembly extends from a wall of a structure to establish, a shelter space resistant to collapse in the event the structure collapses on the assembly. The assembly includes a first panel and a second panel. A pivotable anchor is coupled to a base edge of the first panel such that the first panel is selectively positionable parallel to a wall of the building structure. An upper edge of the second panel is pivotably coupled to a top edge of the first panel. A holding mechanism is coupled to the first panel and the second panel securing the first panel and the second panel in a fully extended static position defining a sheltered space.

11 Claims, 6 Drawing Sheets

EMERGENCY STORM SHELTER ASSEMBLY

This application claims the benefit under 35 U.S.C. Section 119(e) of U.S. Provisional application 61/689,573 filed Jun. 8, 2013.

BACKGROUND OF THE DISCLOSURE

Field of the Disclosure

The disclosure relates to shelter devices and more particularly pertains to a new shelter device for extending from a wall of a structure to establish a shelter space resistant to collapse in the event the structure collapses on the shelter device.

SUMMARY OF THE DISCLOSURE

An embodiment of the disclosure meets the needs presented above by generally comprising a first panel and a second panel. A pivotable anchor is coupled to a base edge of the first panel such that the first panel is selectively positionable parallel to a wall of the building structure. An upper edge of the second panel is pivotably coupled to a top edge of the first panel. A holding mechanism is coupled to the first panel and the second panel securing the first panel and the second panel in a fully extended static position defining a sheltered space.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
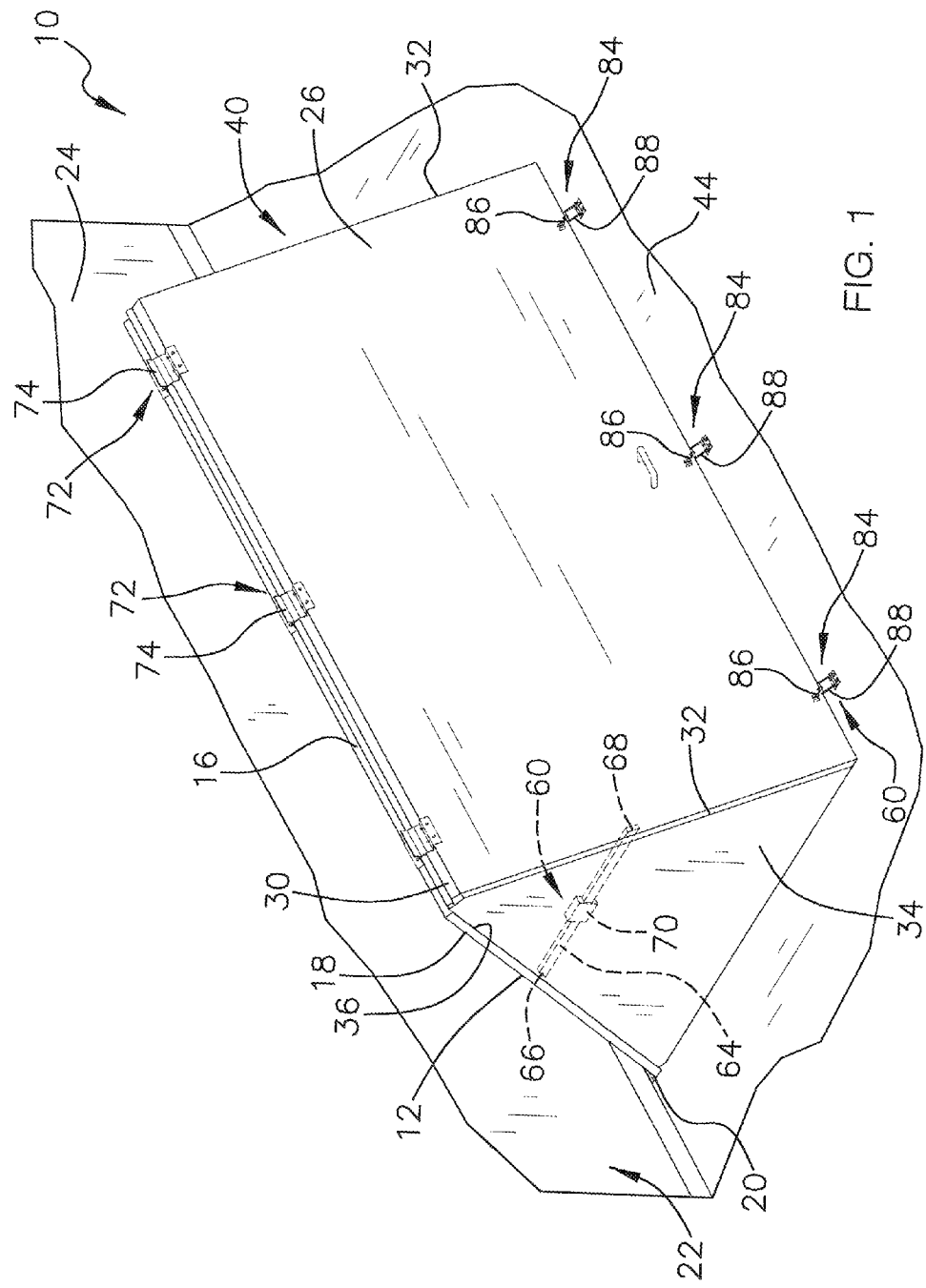
FIG. 1 is a top front side perspective view of a emergency storm shelter assembly according to an embodiment of the disclosure.
Figure 2:
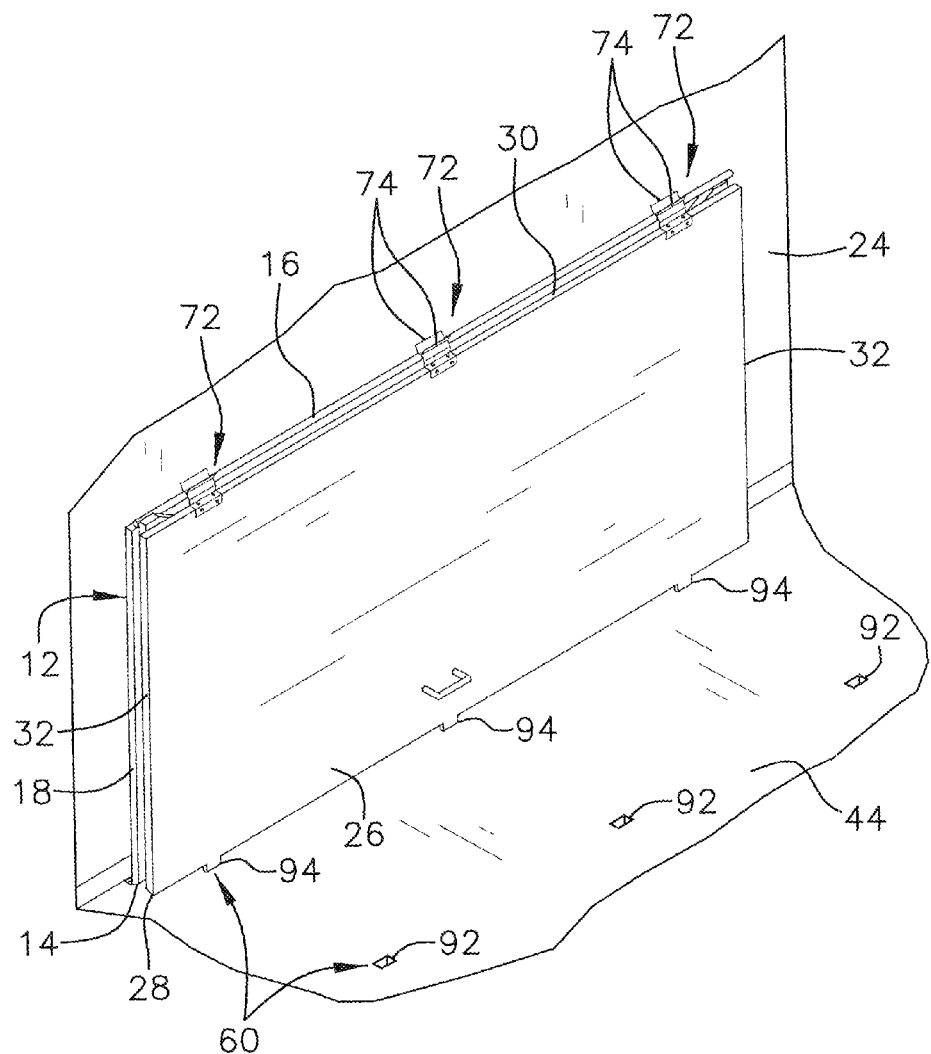
FIG. 2 is a top front side perspective view of an embodiment of the disclosure in a retracted position.
Figure 3:
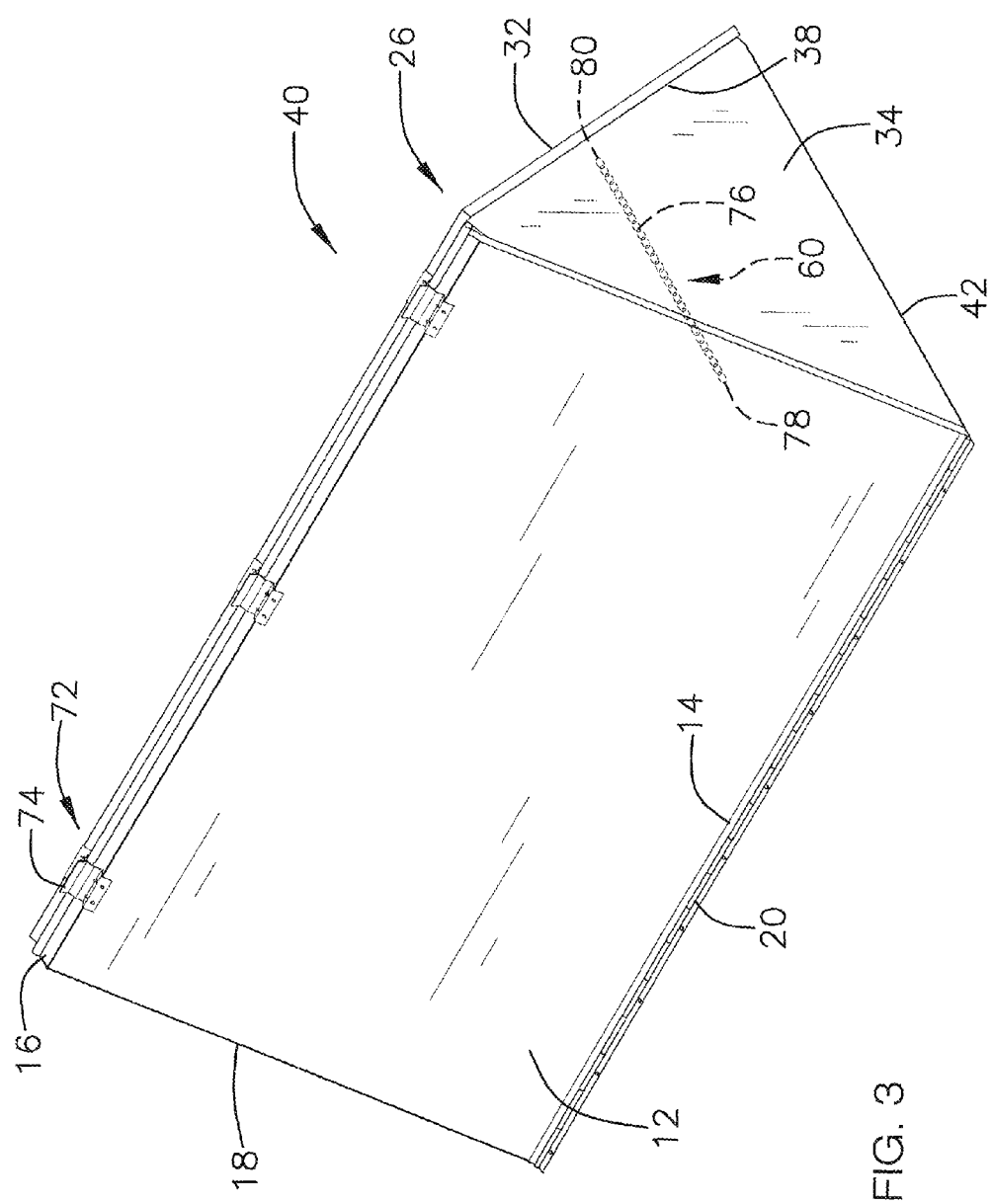
FIG. 3 is a top front side perspective view of an embodiment of the disclosure.
Figure 4:
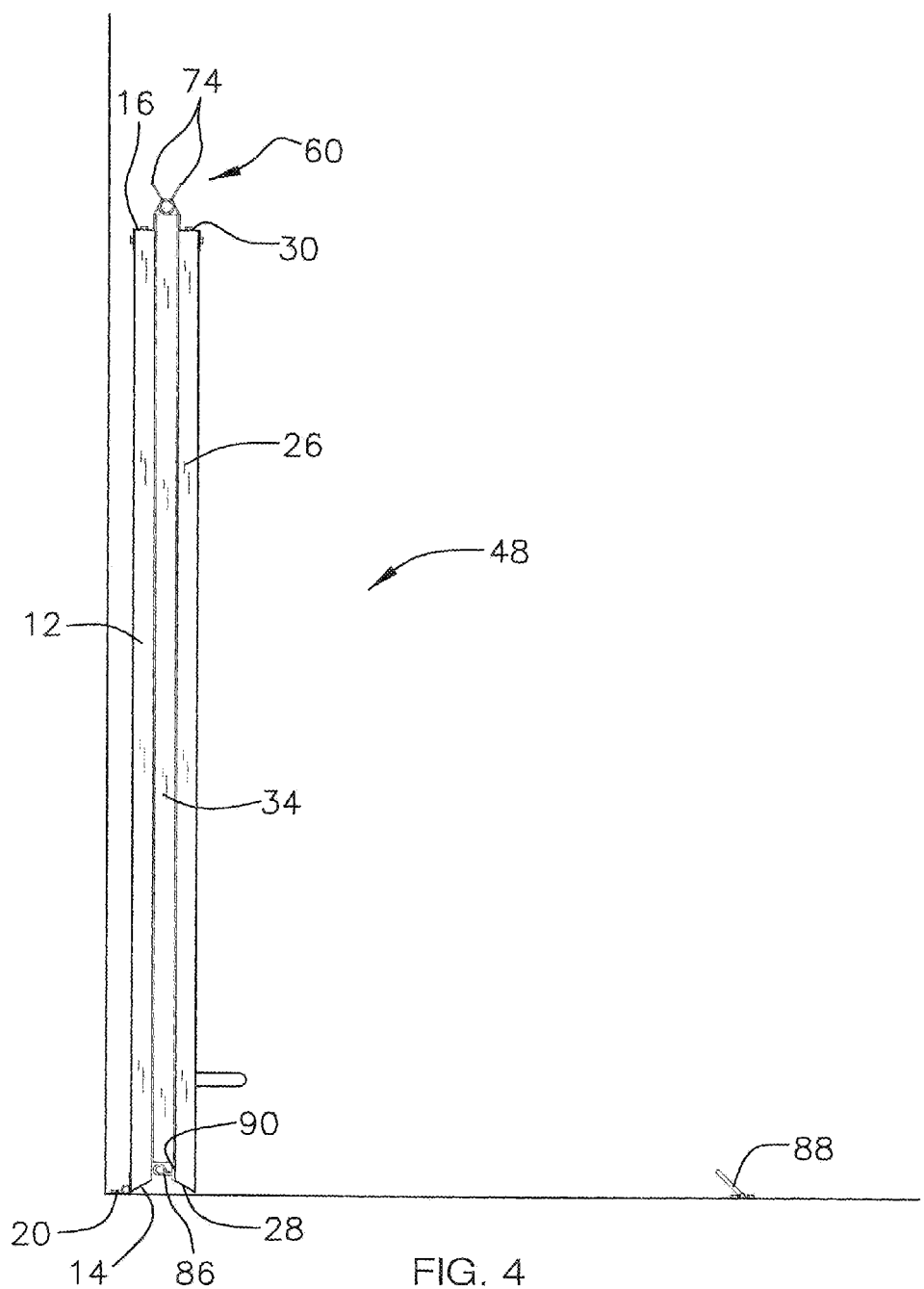
FIG. 4 is a side view of an embodiment of the disclosure in a retracted position.
Figure 5:
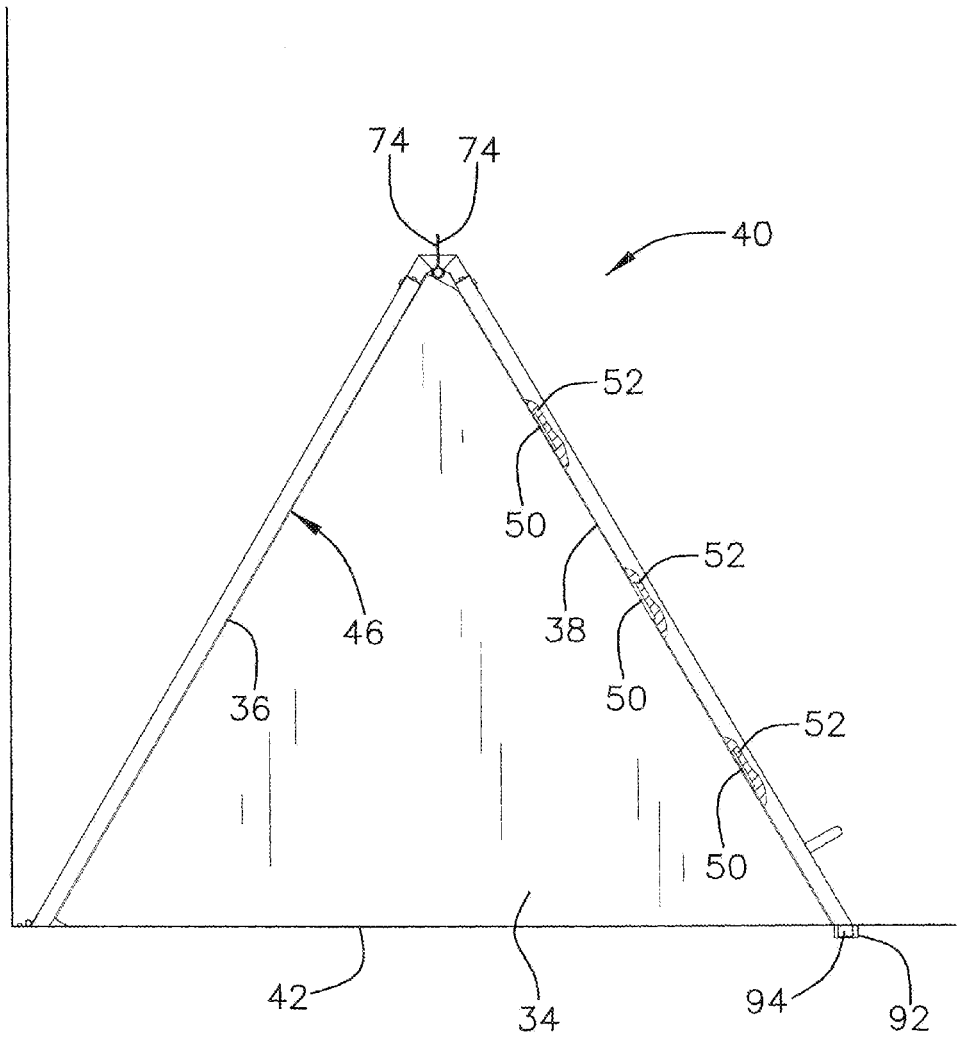
FIG. 5 is a side view of an embodiment of the disclosure in an extended position.
Figure 6:
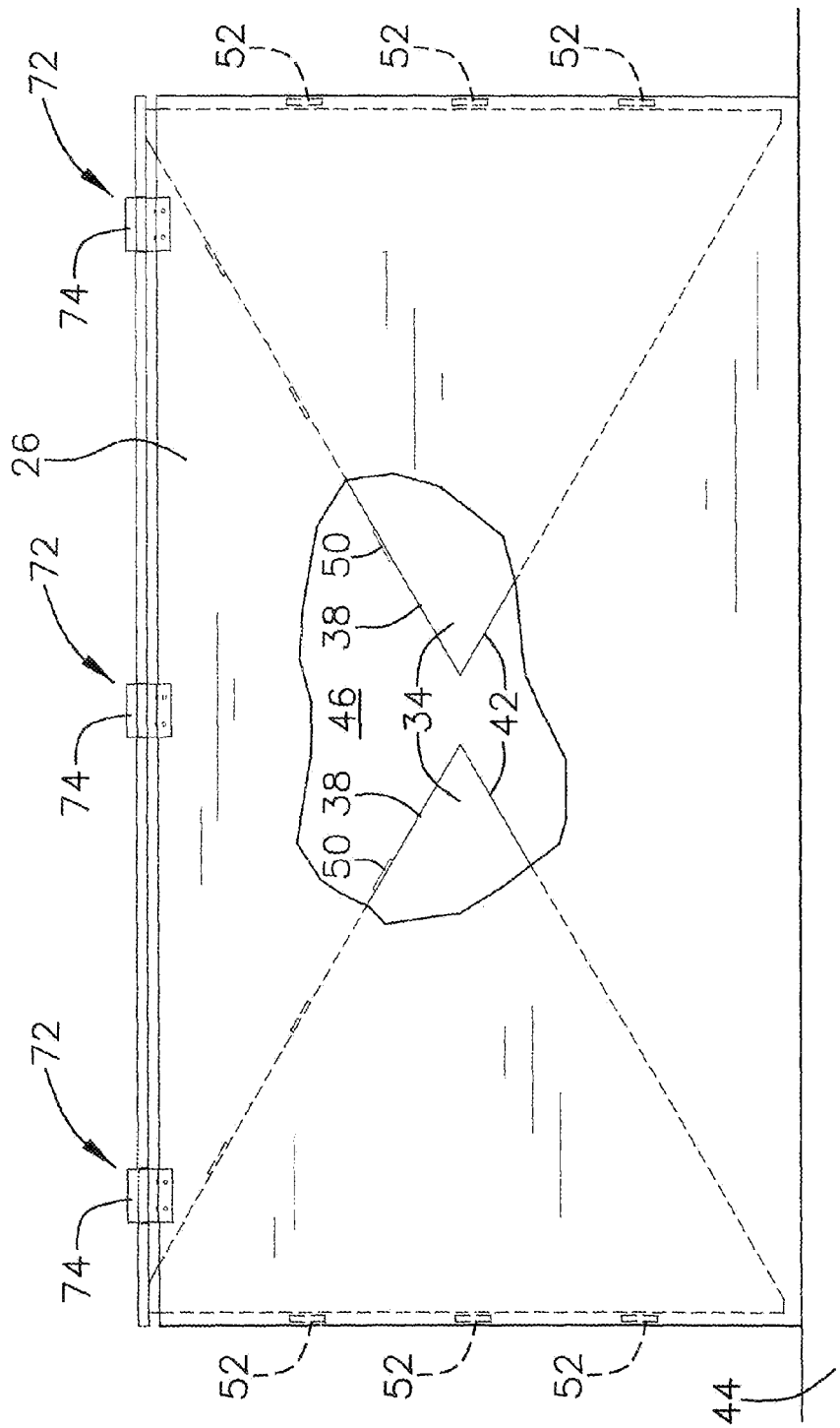
FIG. 6 is a front view of an embodiment of the disclosure in a retracted position.

With reference now to the drawings, and in particular to FIGS. 1 through 6 thereof, a new shelter device embodying the principles and concepts of an embodiment of the disclosure and generally designated by the reference numeral 10 will be described.

As best illustrated in FIGS. 1 through 6, the emergency storm shelter assembly 10 generally comprises a first panel 12 having a base edge 14, a top edge 16, and a pair of end edges 18. The end edges 18 extend between the base edge 14 and the top edge 16. A pivotable anchor 20 is coupled to the base edge 14 of the first panel 12. The first panel 12 may be pivotably coupled to a building structure 22 adjacent to a wall 24 of the building structure 22 by coupling the pivotable anchor 20 to the building structure 22. The pivotable anchor 20 may be fixed to the frame of the building structure to enhance stability of the assembly 10. The building structure 22 may be a house or the like having a foundation. Alternatively, the building structure 22 may comprise a mobile home or the like with or without a permanent or semi-permanent foundation. The first panel 12 may be positioned such that the first panel 12 is selectively positionable parallel to the wall 24 of the building structure 22. The first panel 12 may abut the wall 24, be positioned in proximity to the wall 24, or inset into the wall 24.

A second panel 26 has a bottom edge 28, an upper edge 30 and a pair of end edges 32. The end edges 32 of the second panel 26 extend between the bottom edge 28 and the upper edge 30. The second panel 26 may be of similar size to the first panel 12 and the end edges 18 of the first panel 12 aligned with the end edges 32 of the second panel 26. The upper edge 30 of the second panel 26 is pivotably coupled to the top edge 16 of the first panel 12. The first panel 12 and the second panel 26 are thus positionable to extend outwardly relative to the wall 24 of the building structure 22. Each of the first panel 12 and the second panel 26 may be constructed of a durable material such as steel, metal alloy, or the like of sufficient thickness to prevent debris common to severe storms from piercing the first panel 12 or the second panel 26.

A pair of end doors 34 may be provided. Each end door 34 has a coupled edge 36 pivotally coupled to one of the first panel 12 and the second panel 26. The end doors 34 may both be coupled to the first panel 12, the second panel 26, or one end door 34 to each of the first panel 12 and the second panel 26. Each end door 34 further has a bearing edge 38 positioned to abut the first panel 12 or the second panel 26 opposite the coupled edge 36 when the first panel 12 and second panel 26 are in a fully extended position 40. Each end door 34 may be triangular to fully occupy end spaces formed by the first panel 12 and the second panel 26 in the fully extended position 40. A base edge 42 of each end door 34 is configured to abut a support surface 44 of the building structure 22. Thus, each end door 34 supports the first panel 12 and the second panel 26 in the fully extended position 40. The coupled edge 36 of each end door 34 may be positioned offset from an associated end edge 18,32 of the one of the first panel 12 and the second panel 26 to which the end door 34 is attached. Thus, each end door 34 is positioned under the first panel 12 and the second panel 26 in the fully extended position 40. The coupled edge 36 of each end door 34 may be coupled to a face 46 of the first panel 12 facing away from the wall 24 wherein each end door 34 will pivot towards a deployed position as the second panel 26 is moved away from the wall 24. Each end door 34 may further pivot inwardly such that the end doors 34 are positioned between the first panel 12 and the second panel 26 when the first panel 12 and second panel 26 are in a retracted position 48.

Tabs 50 may be coupled to each end door 34 extending from the bearing edge 38 of an associated one of the end doors 34. Each bearing edge 38 may have a single elongated tab 50 or a plurality of spaced tabs 50 extending along the bearing edge 38. Grooves 52 extend into either the first panel 12 or the second panel 26 such that each of the grooves 52 is positioned to receive an associated one of the tabs 50 in the fully extended position 40. Thus, the tabs 50 restrict pivoting of the end doors 34 while in the fully extended position 40. The end doors 34 are also constructed of a material to provide protection from moving debris to persons positioned under the first panel 12 and second panel 26 when in the fully extended position 40.

A holding mechanism 60 is coupled to the first panel 12 and the second panel 26 securing the first panel 12 and the second panel 26 in the fully extended position defining a sheltered space 62 under the first panel 12 and the second panel 26. The holding mechanism 60 may employ one or more devices preventing inward collapse of the first panel 12 and second panel 26. Each device individually resists collapse of the sheltered space 62. The holding mechanism 60 may employ multiple devices simultaneously for redundancy to enhance protection from collapse of the sheltered space 62.

The holding mechanism 60 may comprise a brace 64 having a first end 66 coupled to the first panel 12 and a second end 68 coupled to the second panel 26. The brace 64 is selectively collapsible to permit positioning of the first panel 12 and the second panel 26 in the retracted position 48. The brace 64 may employ a locking hinge 70 or the like to provide an elongated bar resistant to either compression or tension when in a locked position. The brace 64 secures the first panel 12 and the second panel 26 substantially in the fully extended position 40.

The holding mechanism 60 may comprise a plurality of hinges 72 coupling the top edge 16 to the upper edge 30. The top edge 16 and the upper edge 30 may be positioned to abut each other to limit pivoting between the first panel 12 and the second panel 26. Each hinge 72 may further have a pair of opposed plates 74 positioned to extend outwardly from a respective one of the top edge 16 and the upper edge 30. The plates 74 pivot with the hinge 72 and abut when the first panel 12 and the second panel 26 are substantially in the extended position 40. Thus, the plates 74 restrict further pivoting of the second panel 26 relative to the first panel 12 when the first panel 12 and the second panel 26 are held in the fully extended position 40.

The holding mechanism 60 may also be a chain 76 having a first end 78 coupled to the first panel 12 and a second end 80 coupled to the second panel 26. The chain 76 has a length such that the chain 76 restricts pivoting of the second panel 26 relative to the first panel 12 beyond the fully extended position 40. Thus, the chain 76 holds the first panel 12 and the second panel 26 in the fully extended position 40 and resists collapse of the sheltered space 62. Each of the first end 78 and second end 80 of the chain 76 may be fixed or selectively attached to the first panel 12 and second panel 26 using a hook or other conventional coupler.

The holding mechanism 60 may also be a catch 84 configured for coupling to the support surface 44 of the building structure 22. The catch 84 engages the second panel 26 in the fully extended position 40 wherein the first panel 12 and the second panel 26 are held in the fully extended position 40. The catch 84 may comprise a latch 86 engaging a receiver 88 on an interior face 90 of the second panel 26. The catch 84 may also or alternately comprise a cavity 92 extending into the support surface 44 of the structure 22 and a corresponding projection 94 extending from the bottom edge 28 of the second panel 26. The catch 84 may include one or more cavities 92 and projections 94.

In use, the first panel 12 and second panel 26 are extended from the retracted position 48 to the fully extended position 40 as needed. The end doors 34 are swung into place providing a substantially full enclosure around the sheltered space 62. Thus, the assembly 10 provides protection to persons positioned in the sheltered space 62 during the occurrence of a severe storm such as a tornado. Weight of the assembly 10 and potential connection to the frame or foundation of the building structure 22 resist damage to the sheltered space 62 during a storm. The end doors 34 and the holding mechanism 60 further support the assembly 10 against collapse in the event of debris landing on the assembly 10 such as may happen with catastrophic failure of the building structure 22. Thus, the assembly 10 may provide a survivable pocket protecting persons in the sheltered space 62 until rescuers can effectively dig out the damaged area.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An emergency storm shelter assembly comprising:
a first panel having a base edge, a top edge, and a pair of end edges, said end edges extending between said base edge and said top edge;
a pivotable anchor coupled to said base edge of said first panel wherein said first panel is configured for being pivotably coupled to a building structure adjacent to a wall of the building structure such that said first panel is selectively positionable parallel to the wall of the building structure;
a second panel having a bottom edge, an upper edge, and a pair of end edges, said end edges of said second panel extending between said bottom edge and said upper edge, said upper edge of said second panel being pivotably coupled to said top edge of said first panel, said first panel and said second panel being positionable to extend outwardly from the wall of the building structure;
a holding mechanism coupled to said first panel and said second panel, said holding mechanism securing said first panel and said second panel in a fully extended static position defining a sheltered space under said first panel and said second panel; and
a pair of end doors, each said end door having a coupled edge pivotally coupled to one of said first panel and said second panel, each said end door having a bearing edge positioned to abut one of said first panel and said second panel in said fully extended position, each said end door having a base edge configured to abut a support surface of the building structure wherein each said end door supports said first panel and said second panel in said fully extended position.

2. The assembly of claim 1, further comprising said holding mechanism comprising a brace having a first end coupled to said first panel and a second end coupled to said second panel, said brace being selectively collapsible to permit positioning of said first panel and said second panel in a retracted position, said brace securing said first panel and said second panel in a fully extended static position defining said sheltered space under said first panel and said second panel.

3. The assembly of claim 1, further comprising said second panel being substantially parallel to said first panel in said retracted position.

4. The assembly of claim 1, further comprising said holding mechanism comprising a plurality of hinges coupling said top edge to said upper edge, each hinge having a pair of opposed plates, said plates pivoting with said hinge and abutting when said first panel and said second panel are in said extended position wherein said plates restrict further pivoting of said second panel relative to said first panel wherein said first panel and said second panel are held in said fully extended position by said plates.

5. The assembly of claim 1, further comprising said holding mechanism comprising a chain having a first end coupled to said first panel and a second end coupled to said second panel, said chain having a length such that said chain restricts pivoting of said second panel relative to said first panel beyond said fully extended position wherein said chain holds said first panel and said second panel in said fully extended position.

6. The assembly of claim 1, further comprising said coupled edge of each said end door being positioned offset from an associated end edge of said one of said first panel and said second panel wherein said end door is positioned under said one of said first panel and said second panel in said fully extended position.

7. The assembly of claim 1, further comprising:
a pair of tabs, each said tab extending from said bearing edge of an associated one of said end doors; and
a pair of grooves, each groove extending into one of said first panel and said second panel, each said groove being positioned to receive an associated one of said tabs in said fully extended position wherein said tabs restrict pivoting of said end doors while in said fully extended position.

8. The assembly of claim 1, further comprising said coupled edge of each said end door being coupled to a face of said first panel.

9. The assembly of claim 1, further comprising each said end door pivoting inwardly wherein said end doors are positioned between said first panel and said second panel in said retracted position.

10. The assembly of claim 1, further comprising said holding mechanism comprising a catch configured for coupling to a support surface of the building structure, said catch engaging said second panel in said fully extended position wherein said first panel and said second panel are held in said fully extended position.

11. An emergency storm shelter assembly comprising:
a first panel having a base edge, a top edge, and a pair of end edges, said end edges extending between said base edge and said top edge;
a pivotable anchor coupled to said base edge of said first panel wherein said first panel is configured for being pivotably coupled to a building structure adjacent to a wall of the building structure such that said first panel is selectively positionable parallel to the wall of the building structure;
a second panel having a bottom edge, an upper edge, and a pair of end edges, said end edges of said second panel extending between said bottom edge and said upper edge, said upper edge of said second panel being pivotably coupled to said top edge of said first panel, said first panel and said second panel being positionable to extend outwardly from the wall of the building structure;
a pair of end doors, each said end door having a coupled edge pivotally coupled to one of said first panel and said second panel, each said end door having a bearing edge positioned to abut one of said first panel and said second panel in said fully extended position, each said end door having a base edge configured to abut a support surface of the building structure wherein each said end door supports said first panel and said second panel in said fully extended position, said coupled edge of each said end door being positioned offset from an associated end edge of said one of said first panel and said second panel wherein said end door is positioned under said one of said first panel and said second panel in said fully extended position, said coupled edge of each said end door being coupled to a face of said first panel, each said end door pivoting inwardly wherein said end doors are positioned between said first panel and said second panel in said retracted position;
a pair of tabs, each said tab extending from said bearing edge of an associated one of said end doors;
a pair of grooves, each groove extending into one of said first panel and said second panel, each said groove being positioned to receive an associated one of said tabs in said fully extended position wherein said tabs restrict pivoting of said end doors while in said fully extended position; and
a holding mechanism coupled to said first panel and said second panel, said holding mechanism securing said first panel and said second panel in a fully extended static position defining a sheltered space under said first panel and said second panel, said holding mechanism comprising
a brace having a first end coupled to said first panel and a second end coupled to said second panel, said brace being selectively collapsible to permit positioning of said first panel and said second panel in a retracted position, said brace securing said first panel and said second panel in a fully extended static position defining a sheltered space under said first panel and said second panel, said second panel being substantially parallel to said first panel in said retracted position,
a plurality of hinges coupling said top edge to said upper edge, each hinge having a pair of opposed plates, said plates pivoting with said hinge and abutting when said first panel and said second panel are in said extended position wherein said plates restrict further pivoting of said second panel relative to said first panel wherein said first panel and said second panel are held in said fully extended position by said plates,
a chain having a first end coupled to said first panel and a second end coupled to said second panel, said chain having a length such that said chain restricts pivoting of said second panel relative to said first panel beyond said fully extended position wherein said chain holds said first panel and said second panel in said fully extended position, and a catch configured for coupling to a support surface of the building structure, said catch engaging said second panel in said fully extended position wherein said first panel and said second panel are held in said fully extended position.

\* \* \* \* \*